(12) United States Patent
Niezur et al.

(10) Patent No.: US 7,748,773 B2
(45) Date of Patent: Jul. 6, 2010

(54) STRUCTURAL MEMBER REINFORCEMENT

(75) Inventors: Michael C. Niezur, Southfield, MI (US); Nicolo Amico, Warren, MI (US)

(73) Assignee: Sika Technology AG, Baar (CH)

( * ) Notice: Subject to any disclaimer, the term of this patent is extended or adjusted under 35 U.S.C. 154(b) by 28 days.

(21) Appl. No.: 11/967,791

(22) Filed: Dec. 31, 2007

(65) Prior Publication Data

US 2009/0167055 A1 Jul. 2, 2009

(51) Int. Cl.
*B60J 7/00* (2006.01)
(52) U.S. Cl. .............................. 296/187.02; 296/193.06
(58) Field of Classification Search ............ 296/187.02, 296/193.05, 193.06
See application file for complete search history.

(56) References Cited

U.S. PATENT DOCUMENTS 7,503,620 B2 * 3/2009 Brennecke et al. ..... 296/187.02

FOREIGN PATENT DOCUMENTS

| EP | 1593872 A1 | 11/2005 |
|---|---|---|
| EP | 1707477 A | 10/2006 |
| GB | 2375328 A | 11/2002 |
| WO | WO-02074609 A1 | 9/2002 |

OTHER PUBLICATIONS

International Search Report for PCT/EP2008/068169.

* cited by examiner

*Primary Examiner*—Joseph D Pape
(74) *Attorney, Agent, or Firm*—Rader, Fishman & Grauer PLLC

(57) ABSTRACT

A structural member reinforcement includes a body portion having a plurality of side walls. The side walls are spaced to define an opening therebetween. A plurality of cells are disposed in the opening between the side walls. Each of the plurality of cells defines a channel. An expandable material, such as structural foam or noise vibration and harshness (NVH) foam, is disposed in the channel of at least one of the plurality of cells. The reinforcement may be used to reinforce a structural member, such as a vehicle frame. The structural member may define a cavity, and the reinforcement may be disposed within the cavity.

16 Claims, 5 Drawing Sheets

STRUCTURAL MEMBER REINFORCEMENT

BACKGROUND

1. Field of the Invention

The present disclosure relates to a reinforcement for a structural member.

2. Description of the Related Art

Reinforcing structural members is beneficial to many different industries when manufacturing products to have a minimum amount of structural integrity. Often times, weight is a consideration when making such reinforcements. To reduce weight, the structural member may be hollow, defining a cavity. A reinforcement may be placed in the cavity to strengthen the structural member, the idea being that the weight of the structural member with the reinforcement is lower than the weight of a solid structural member. This is especially true if the reinforcement is made from lighter materials than the structural member. For instance, the structural member may be formed from steel, whereas the reinforcement may be formed from a plastic.

Another consideration is the structural integrity of the hollowed structural member with the reinforcement disposed in the cavity. This is especially true if the reinforcement is formed from a lighter material than the structural member. Increasing the structural integrity of the reinforcement may include providing the reinforcement with an internal rib structure or coating an outer surface of the reinforcement with a structural foam. Although previous configurations of the internal rib structure and the structural foam on the outside of the reinforcement have met the standards for reinforcing the structural member, other configurations of the reinforcement may further increase the structural integrity of the reinforcement and the structural member. This may be beneficial to many industries, such as the automotive or aerospace industries, where a significant increase in structural integrity with a minimum increase in weight is ideal.

Accordingly, despite previous attempts to increase the structural integrity of the reinforcement and the structural member, a reinforcement is needed that improves upon the internal rib structure of the previous reinforcements by increasing the structural integrity of the reinforcement and the structural member without a significant increase in weight.

BRIEF DESCRIPTION OF THE DRAWINGS

The disclosure becomes better understood by reference to the following detailed description when considered in connection with the accompanying drawings, wherein.

DETAILED DESCRIPTION

A reinforcement is provided that includes a body portion that has a plurality of side walls. The side walls define an opening, and a plurality of cells are disposed in the opening between the side walls. Each of the plurality of cells defines a channel, and an expandable material is disposed in the channel of at least one of the plurality of cells. Accordingly, the reinforcement may provide structural support and/or sound and vibration dampening in the cavity.

Figure 1:
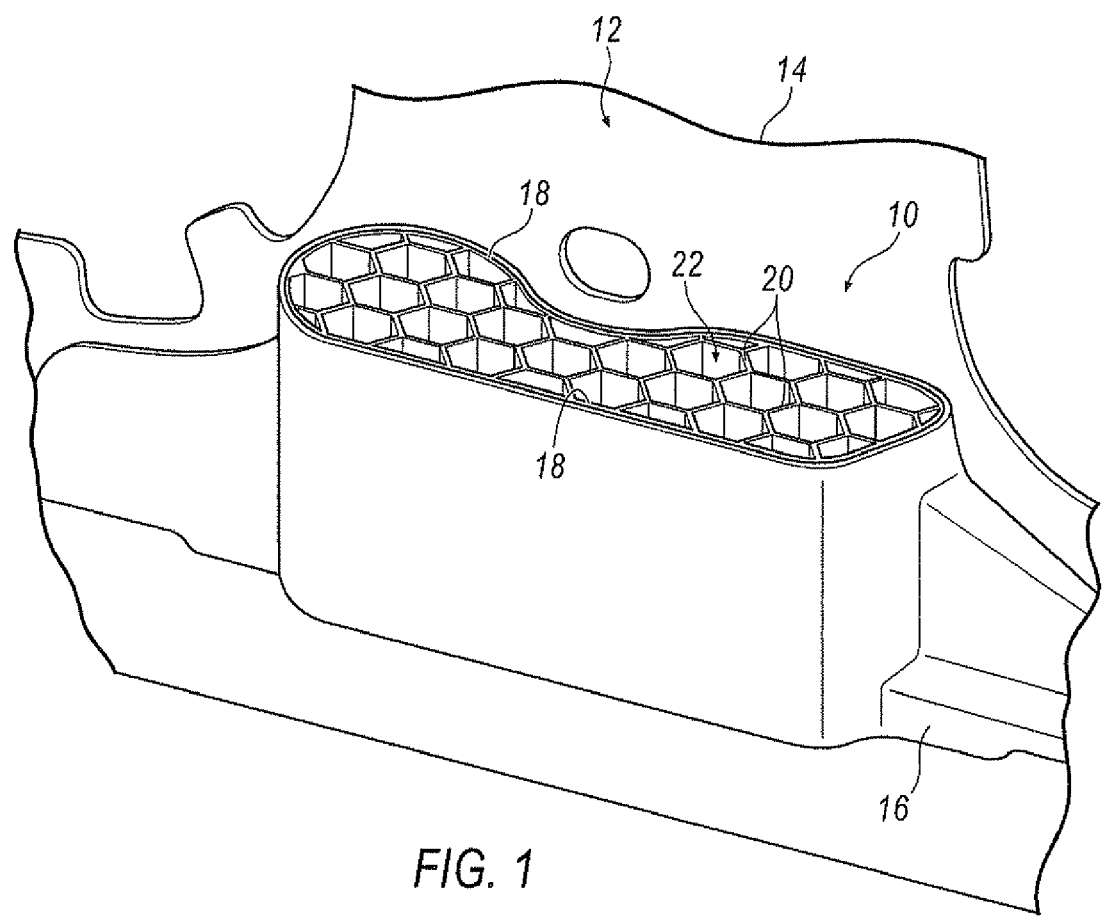
FIG. 1 is a perspective view of a reinforcement disposed in a cavity defined by a frame according to an embodiment.

Referring to the Figures, wherein like numerals indicate like or corresponding parts throughout the several views, a reinforcement 10 is shown at numeral 10. FIG. 1 illustrates an exemplary reinforcement 10 disposed in a cavity 12 defined by a frame 14. The reinforcement 10 includes a body portion 16 having a plurality of side walls 18 defining an opening therebetween. A plurality of cells 20 are disposed in the opening between the side wall 18. Each of the plurality of cells 20 defines a channel 22. In one embodiment, the channel 22 has an open-ended configuration. As discussed in greater detail below, the open-ended configuration may be further defined as a hexagonal configuration, a cylindrical configuration, a conical configuration, or a telescoping configuration. The various configurations may improve energy dissipation and provide additional structural integrity when forces act to compress the frame 14 and the reinforcement 10. The plurality of cells 20 may be integrally formed with one another and/or integrally formed with the body portion 16.

In one embodiment, the frame 14 is a vehicle frame 14; however, it is to be appreciated that the frame 14 and the reinforcement 10 may be used in other applications. Vehicle frame may be formed from steel and the body portion 16 of the reinforcement 10 may be formed from nylon. The reinforcement 10 may be formed using various methods, including extrusion or injection molding. It is to be further understood that the frame 14 and reinforcement 10 may be formed from other materials.

The frame 14 defines an axis that extends through the cavity 12. Depending on the application, the reinforcement 10 may be disposed in various orientations relative to the axis. For example, the reinforcement 10 may be disposed in the cavity 12 parallel to the axis. Specifically, the channel 22 defined by the plurality of cells 20 is parallel to the axis. In another embodiment, the reinforcement 10 may be disposed in the cavity 12 perpendicular to the axis. Specifically, the channel 22 defined by the plurality of cells 20 is perpendicular to the axis. The various orientations of the reinforcement 10 may aid in energy dissipation, reduce crushing of the frame 14, or have other benefits.

Referring now to FIGS. 2-7, an expandable material 24 is disposed in the channel 22 of at least one of the plurality of cells 20. Also, the expandable material 24 may be disposed on at least one of the plurality of side walls 18. In one embodiment, the expandable material 24 that is disposed in the channel 22 of the cells 20 is the same type of expandable material 24 that is disposed on the side wall 18. The expandable material 24 of the reinforcement 10 may be formed from an epoxy-based resin. For instance, the expandable material 24 may be structural foam or a noise vibration and harshness (NVH) foam. However, it is to be appreciated that the expandable material 24 may be any other material besides a structural foam or a NVH foam. In another embodiment, a first expandable material 26 is disposed in the channel 22 of at least one of the cells 20 and a second expandable material 28 is disposed on at least one of the side wall 18. In one embodiment, the first expandable material 26 and the second expandable material 28 are different types of structural foams. In this embodiment, both the first expandable material 26 and the second expandable material 28 increase the structural integrity of the reinforcement 10 and the frame 14. In another embodiment, the first expandable material 26 is the NVH foam and the second expandable material 28 is the structural foam. In this embodiment, the first expandable material 26 may be used to reduce noise and vibrations while the second expandable material 28 increases the structural integrity of the frame 14. Regardless of the type used, expanding the expandable material 24 may include heating the expandable material 24. For instance, in a vehicle assembly line, the vehicle is heated as it passes through a paint bake oven. The heat from the paint bake oven may be used to expand the expandable material 24.

Figure 2:
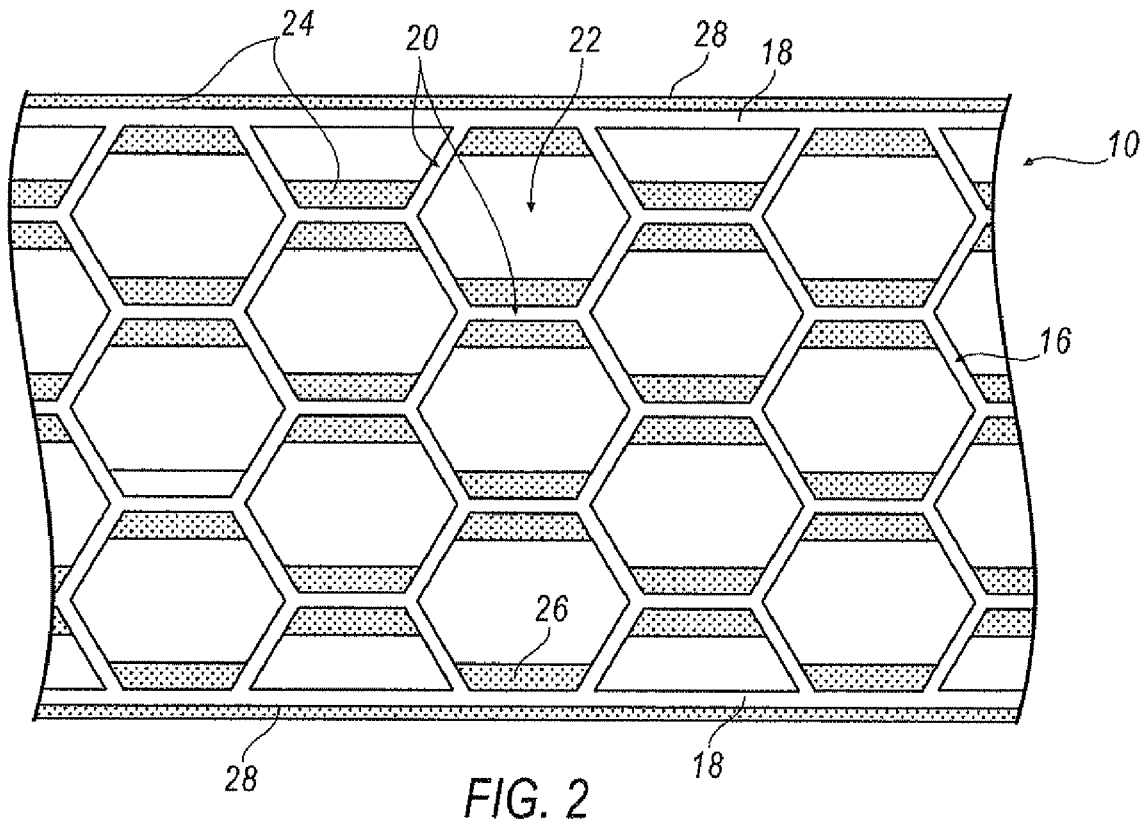
FIG. 2 is a top view of the reinforcement having a plurality of cells with a hexagonal configuration and an expandable material disposed within the plurality of cells according to a first embodiment.
Figure 3:
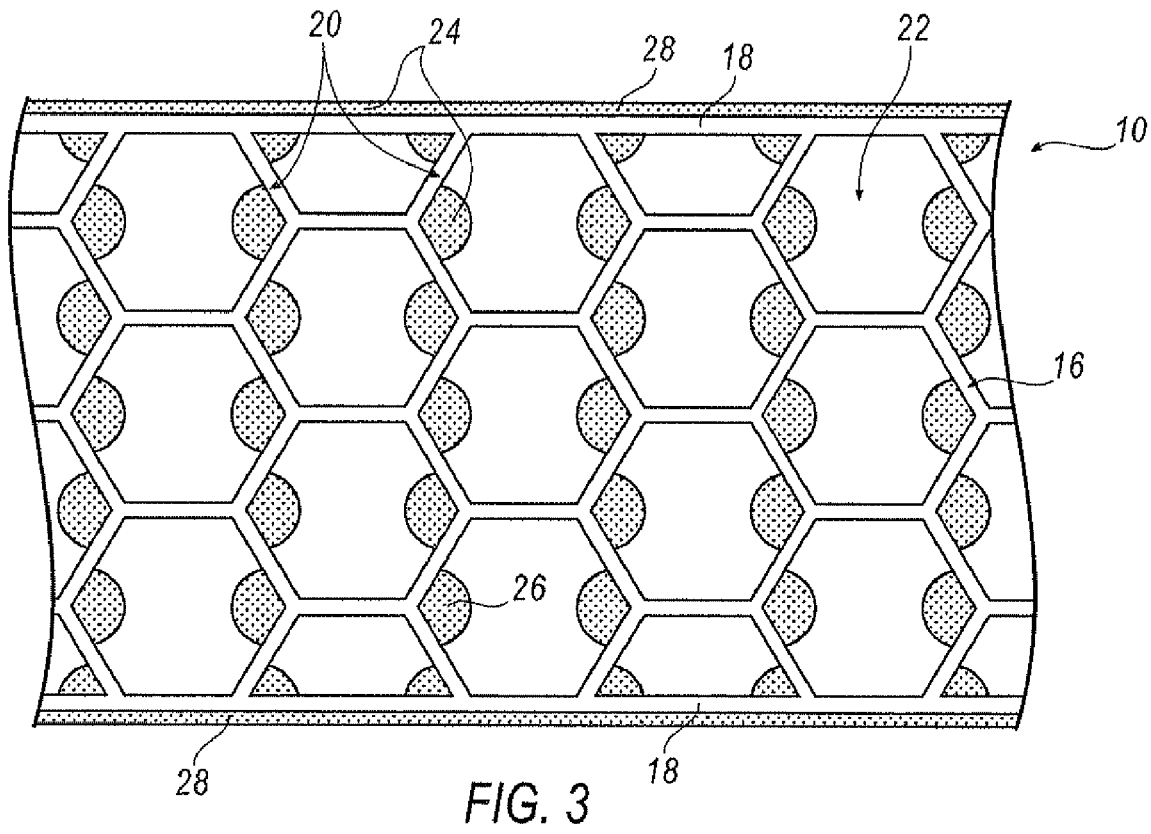
FIG. 3 is a top view of the reinforcement having the plurality of cells with the hexagonal configuration and the expandable material disposed within the plurality of cells according to a second embodiment.
Figure 4:
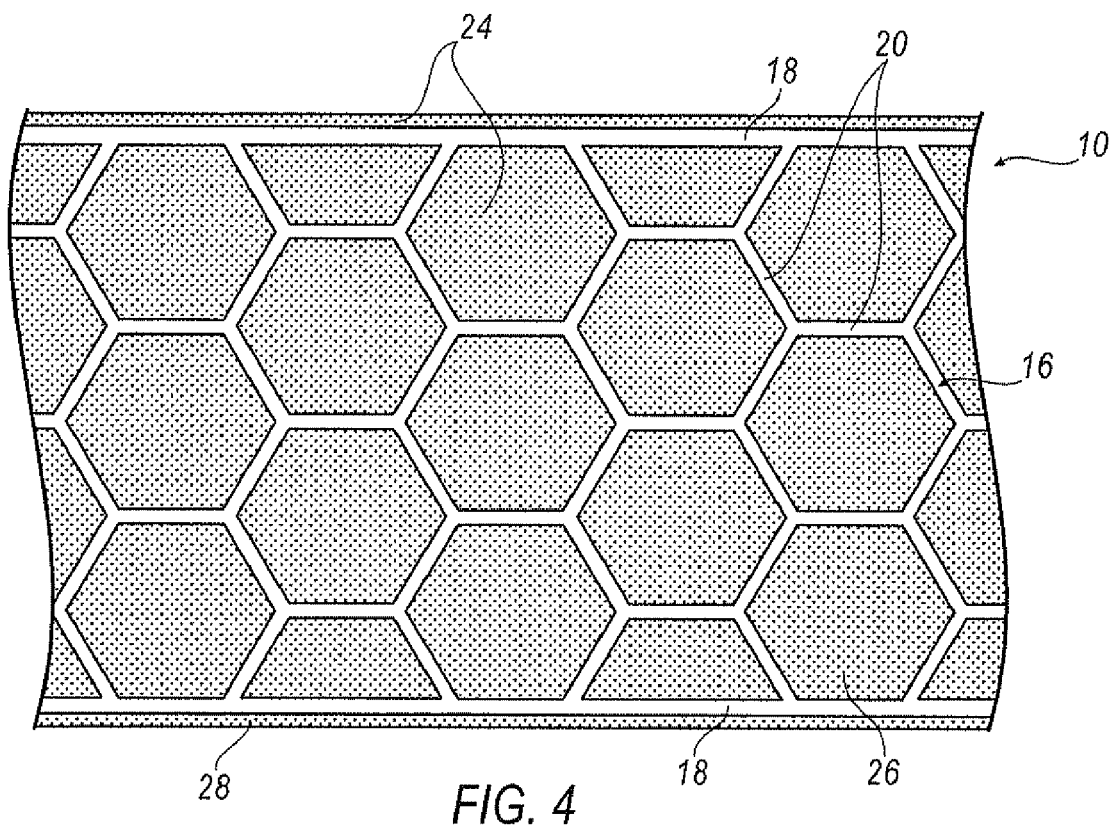
FIG. 4 is a top view of the reinforcement of FIGS. 2 and 3 after the expandable material has expanded according to an embodiment.

FIG. 2 illustrates, in one embodiment, a perspective view of the reinforcement 10 having cells 20 with the hexagonal configuration. The expandable material 24 is disposed inside the channels 22 defined by the cells 20, and specifically, the expandable material 24 coats at least one of the inner walls of the cells 20. In another embodiment, referring now to FIG. 3, the expandable material 24 is disposed at a corner between two of the inner walls of the cells 20. Regardless of the location, the expandable material 24 may be disposed in the channel 22 using various methods. For instance, the reinforcement 10 may be over molded to include the expandable material 24. However, it is to be understood that the expandable material 24 may be disposed in the cells 20 via other methods. Referring now to FIG. 4, once expanded, the expandable material 24 fills the channel 22 defined by the cells 20 having the hexagonal configuration.

Figure 5:
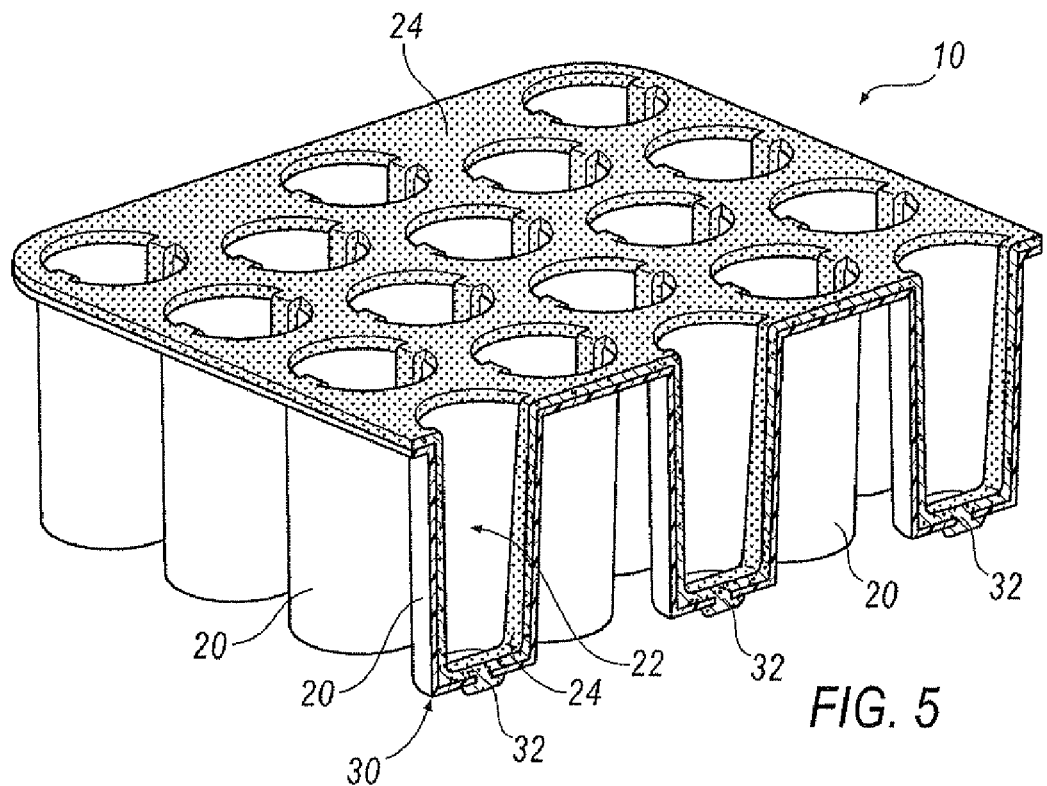
FIG. 5 is a perspective view of the reinforcement having a plurality of cells with a cylindrical configuration and the expandable material disposed within the plurality of cells according to an embodiment.

FIG. 5 illustrates, in another embodiment, a perspective view of the reinforcement 10 having the cells 20 with the cylindrical configuration. Like in the previous embodiment, the expandable material 24 is disposed inside the channels 22 defined by the cells 20, and specifically, the expandable material 24 is disposed on at least a portion of the inner wall of the cells 20. The expandable material 24 may be disposed in the channel 22 using various methods. For instance, the reinforcement 10 may be over molded to include the expandable material 24. However, it is to be understood that the expandable material 24 may be disposed in the cells 20 via other methods. Once expanded, the expandable material 24 fills the channel 22 defined by the cell 20 having the cylindrical configuration. In addition, the expandable material 24 may further be disposed on the body portion 16 of the reinforcement 10 having cells 20 with the cylindrical configuration. In one embodiment, a bottom portion 30 of each cell 20 may define a hole. As such, the expandable material 24 may include a plurality of pins 32, each one extending through one of the holes. This may allow the expandable material 24 to remain disposed on the reinforcement 10 before the expandable material 24 is expanded.

Figure 6:
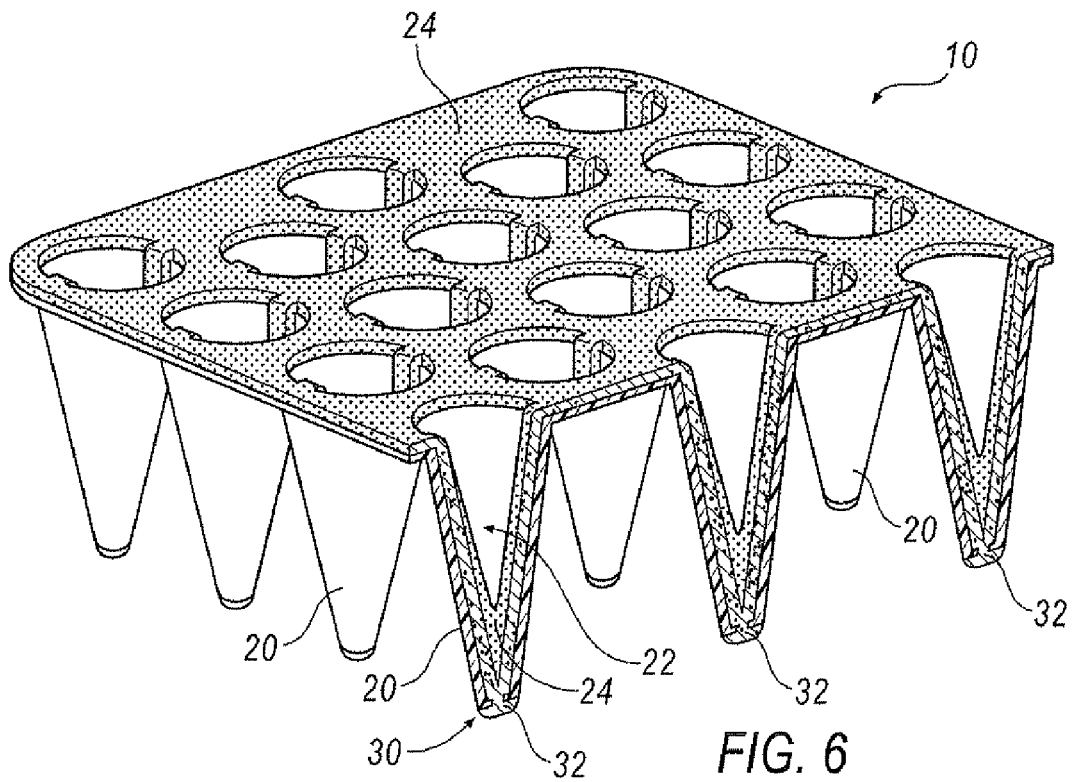
FIG. 6 is a perspective view of the reinforcement having a plurality of cells with a conical configuration and the expandable material disposed within the plurality of cells according to an embodiment.

FIG. 6 illustrates, in yet another embodiment, a perspective view of the reinforcement 10 having the cells 20 with the conical configuration. Like in the previous embodiment, the expandable material 24 is disposed inside the channels 22 defined by the cells 20, and specifically, the expandable material 24 is disposed on at least a portion of the inner wall of the cells 20. The expandable material 24 may be disposed in the channel 22 using various methods. For instance, the reinforcement 10 may be over molded to include the expandable material 24. However, it is to be understood that the expandable material 24 may be disposed in the cells 20 via other methods. Once expanded, the expandable material 24 fills the channel 22 defined by the cell 20 having the conical configuration. In addition, the expandable material 24 may further be disposed on the body portion 16 of the reinforcement 10 having cells 20 with the conical configuration. As in the previous embodiment the bottom portion 30 of each cell 20 may define the hole. As such, the expandable material 24 may include the plurality of pins 32, each one extending through one of the holes. This may allow the expandable material 24 to remain disposed on the reinforcement 10 before the expandable material 24 is expanded.

Figure 7:
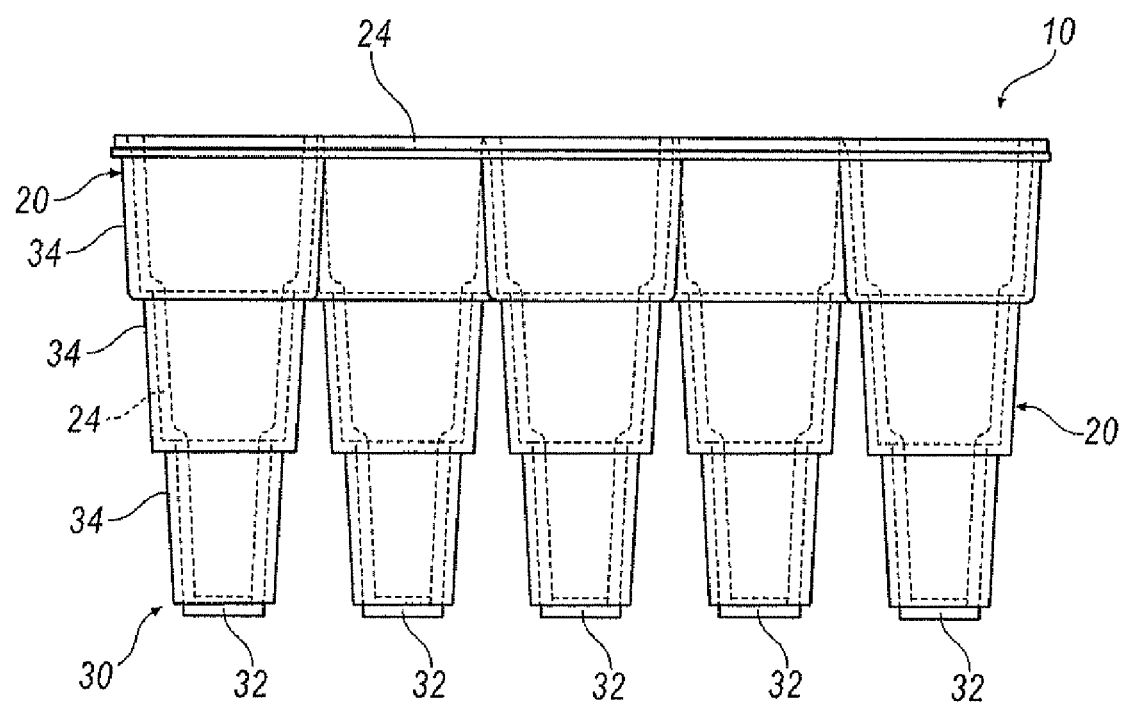
FIG. 7 is a side view of the reinforcement having a plurality of cells with a telescoping configuration and the expandable material disposed within the plurality of cells according to an embodiment.

FIG. 7 illustrates, in yet another embodiment, a side view of the reinforcement 10 having the cells 20 with the telescoping configuration. Specifically, each cell 20 includes at least two segments 34 having different sizes, but similar shapes. As illustrated, each cell 20 has three segments 34 having a generally circular shape. However, it is to be appreciated that each cell 20 may have any number of segments 34 or generally any shape. Also, the segments 34 may be disposed in a telescoping configuration. Like in the previous embodiments, the expandable material 24 is disposed inside the channels 22 defined by the cells 20, and specifically, the expandable material 24 is disposed on at least a portion of the inner wall of the cells 20. The expandable material 24 may be disposed in the channel 22 using various methods. For instance, the reinforcement 10 may be over molded to include the expandable material 24. However, it is to be understood that the expandable material 24 may be disposed in the cells 20 via other methods. Once expanded, the expandable material 24 fills the channel 22 defined by the cell 20 having the telescoping configuration. In addition, the expandable material 24 may further be disposed on the body portion 16 of the reinforcement 10 having cells 20 with the telescoping configuration. As in the previous embodiment, the bottom portion 30 of each cell 20 may define the hole. As such, the expandable material 24 may include the plurality of pins 32, each one extending through one of the holes. This may allow the expandable material 24 to remain disposed on the reinforcement 10 before the expandable material 24 is expanded.

It is to be understood that the above description is intended to be illustrative and not restrictive. Many embodiments and applications other than the examples provided would be apparent to those skilled in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. A reinforcement comprising:
a body portion having a plurality of side walls defining an opening therebetween;
a plurality of cells disposed in said opening between said side walls and each of said plurality of cells defining a channel, wherein a bottom portion of each of said plurality of cells defines a hole; and
an expandable material disposed in said channel of at least one of said plurality of cells, wherein said expandable material includes a plurality of pins, each extending through one of said holes.

2. A reinforcement as set forth in claim 1 wherein said plurality of cells have an open-ended configuration.

3. A reinforcement as set forth in claim 2 wherein said open-ended configuration is further defined as at least one of a hexagonal configuration, a cylindrical configuration, and a conical configuration.

4. A reinforcement as set forth in claim 1 wherein said plurality of cells are integrally formed with one another.

5. A reinforcement as set forth in claim 1 wherein said expandable material is further disposed on at least one of said plurality of side walls.

6. A reinforcement as set forth in claim 5 wherein said expandable material is a structural foam.

7. A reinforcement as set forth in claim 1 wherein said expandable material is further defined as a first expandable material disposed in said channel of at least one of said plurality of cells and further comprising a second expandable material disposed on at least one of said plurality of side walls.

8. A reinforcement as set forth in claim 7 wherein said first expandable material and said second expandable material are structural foams.

9. A reinforcement as set forth in claim 7 wherein said first expandable material is a noise vibration and harshness (NVH) foam and said second expandable material is a structural foam.

10. A reinforcement comprising:
a body portion having a plurality of side walls defining an opening therebetween;
a plurality of cells having an open ended configuration, said plurality of cells being disposed in said opening between said side walls and each of said plurality of cells defining a channel, wherein a bottom portion of each of said plurality of cells defines a hole;
a first expandable material disposed in said channel of at least one of said plurality of cells; and
a second expandable material disposed on at least one of said plurality of side walls,
wherein said first expandable material includes a plurality of pins, each extending through one of said holes.

11. A reinforcement as set forth in claim 10 wherein said first expandable material and said second expandable material are structural foams.

12. A reinforcement as set forth in claim 10 wherein said first expandable material is a noise vibration and harshness (NVH) foam and said second expandable material is a structural foam.

13. A reinforcement as set forth in claim 10 wherein said open-ended configuration is further defined as at least one of a hexagonal configuration, a cylindrical configuration, and a conical configuration.

14. A vehicle comprising:
a structural member defining a cavity; and
a reinforcement disposed in said cavity, said reinforcement including a body portion having a plurality of side walls defining an opening therebetween, a plurality of cells disposed in said opening between said side walls and each of said plurality of cells defining a channel, and an expandable material disposed in said channel of at least one of said plurality of cells,
wherein a bottom portion of each of said plurality of cells defines a hole and said expandable material includes a plurality of pins, each extending through one of said holes.

15. A vehicle as set forth in claim 14 wherein said plurality of cells has an open-ended configuration.

16. A vehicle as set forth in claim 15 wherein said open-ended configuration is further defined as at least one of a hexagonal configuration, a cylindrical configuration, and a conical configuration.

* * * * *